United States Patent
Omerovic

(10) Patent No.: US 8,694,062 B2
(45) Date of Patent: Apr. 8, 2014

(54) ELECTRONIC DEVICES HAVING MULTIPLE KEYPADS AND RELATED METHODS

(75) Inventor: Idris Omerovic, Lund (SE)

(73) Assignees: Sony Corporation, Tokyo (JP); Sony Mobile Communication AB, Lund (SE)

( * ) Notice: Subject to any disclaimer, the term of this patent is extended or adjusted under 35 U.S.C. 154(b) by 269 days.

(21) Appl. No.: 12/909,310

(22) Filed: Oct. 21, 2010

(65) Prior Publication Data

US 2012/0100891 A1    Apr. 26, 2012

(51) Int. Cl.
*H04B 1/38* (2006.01)

(52) U.S. Cl.
USPC .......... 455/575.4; 455/575.1; 455/575.3; 455/347; 455/90.3

(58) Field of Classification Search
USPC ........ 455/90.3, 566, 575.1, 575.3, 575.4, 347
See application file for complete search history.

(56) References Cited

U.S. PATENT DOCUMENTS

| | | | |
|---|---|---|---|
| 7,512,427 B2 * | 3/2009 | Finke-Anlauff et al. | .. 455/575.1 |
| 7,885,693 B2 * | 2/2011 | Park et al. | ........... 455/575.4 |
| 2003/0147205 A1 | 8/2003 | Murphy | |
| 2003/0202656 A1 | 10/2003 | Ikeuchi | |
| 2005/0059438 A1 * | 3/2005 | Jellicoe | ........ 455/575.1 |
| 2005/0070348 A1 * | 3/2005 | Lee et al. | ............ 455/575.4 |
| 2007/0287512 A1 * | 12/2007 | Kilpi et al. | ........... 455/575.1 |

FOREIGN PATENT DOCUMENTS

| | | |
|---|---|---|
| EP | 1 770 965 A1 | 4/2007 |
| WO | WO 2008/004912 A1 | 1/2008 |

OTHER PUBLICATIONS

Extended European Search Report for EP Application No. 11178065.6-2414 dated Jan. 30, 2012.

* cited by examiner

*Primary Examiner* — Tuan Pham
(74) *Attorney, Agent, or Firm* — Myers Bigel Sibley & Sajovec, PA

(57) ABSTRACT

A device includes an upper unit having a display screen thereon and a first slidable unit having a first keypad thereon. The first slidable unit is slidably connected to the upper unit on a side opposite the display screen. The first slidable unit is movable between a closed position in which the upper unit generally overlies the first keypad and an open position in which the first keypad is positioned generally adjacent the display screen. A second slidable unit has a second keypad thereon. The second slidable unit is slidably connected to the upper unit and the first slidable unit. The second slidable unit is movable between a closed position in which the upper unit generally overlies the second keypad and an open position in which the second keypad is positioned generally adjacent the display screen.

11 Claims, 10 Drawing Sheets

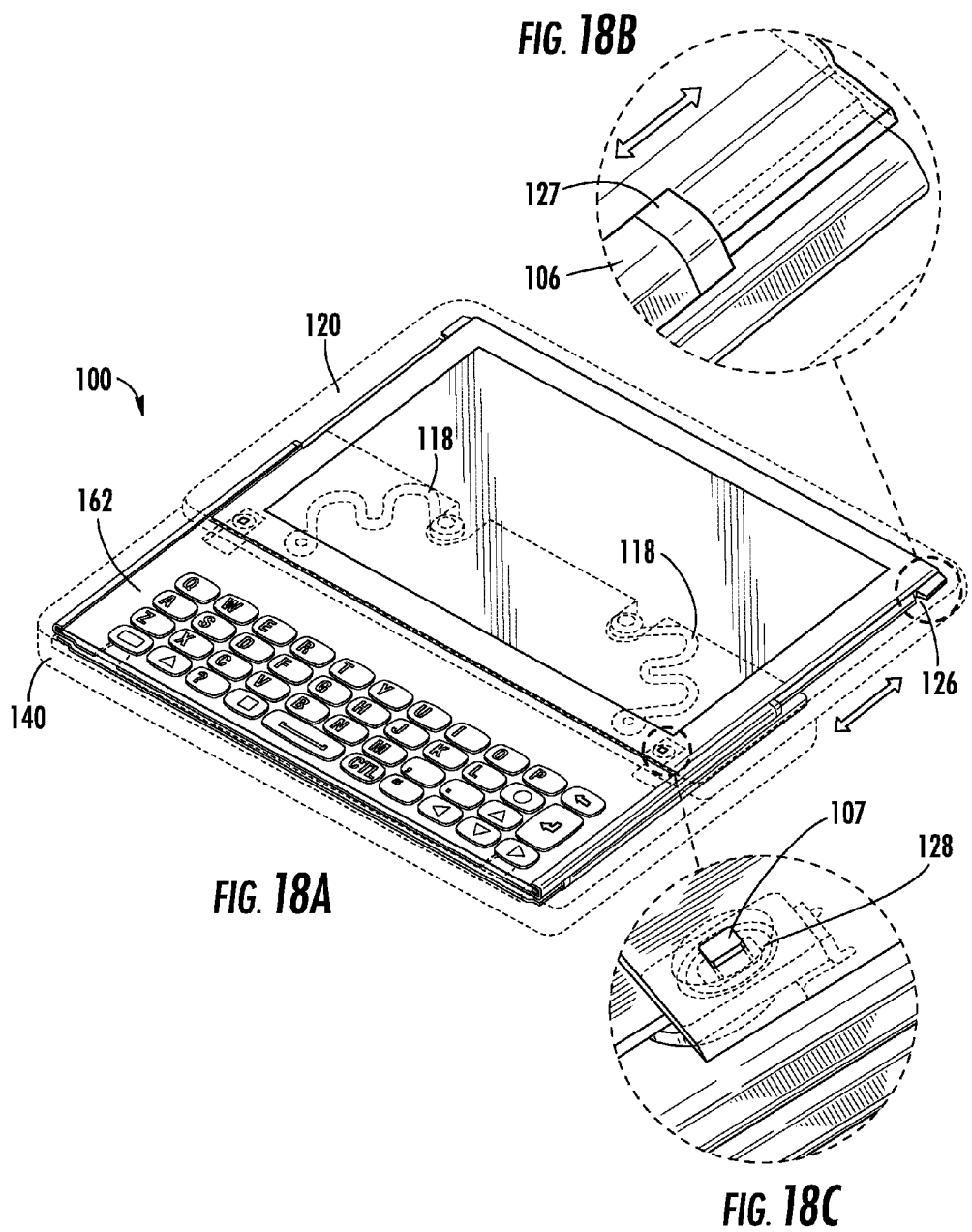

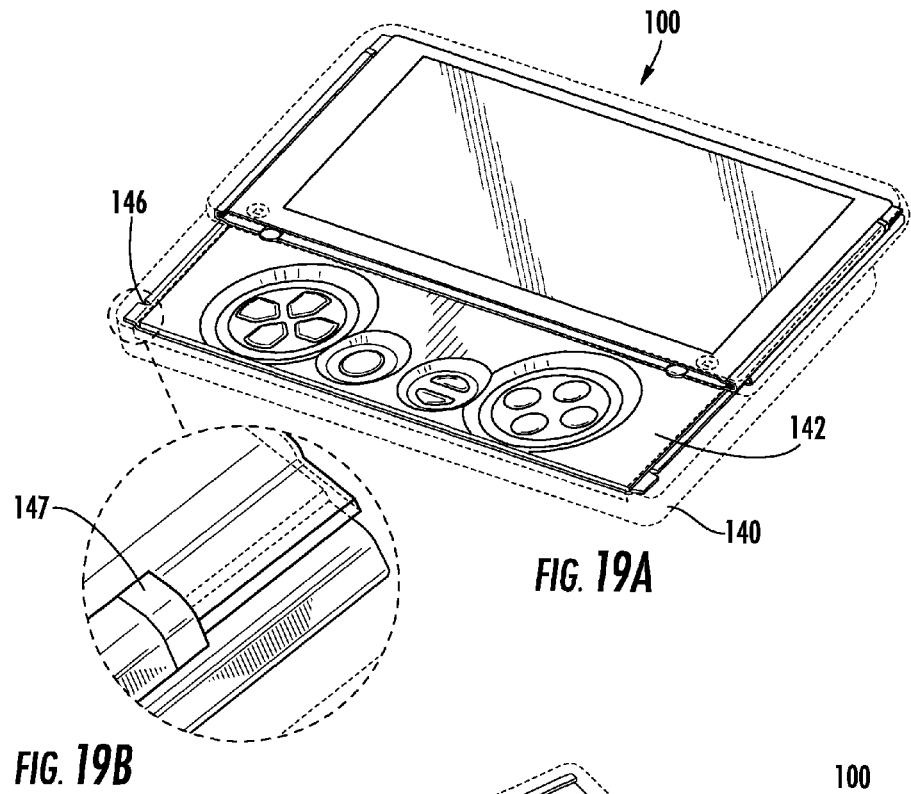
FIG. 19A
FIG. 19B
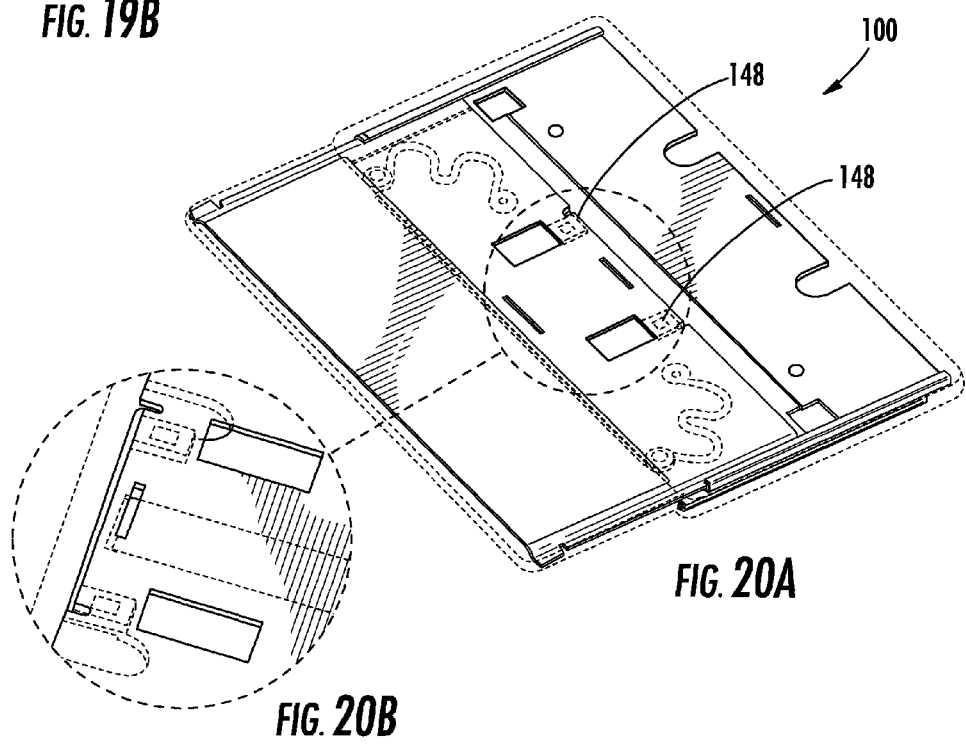
FIG. 20A
FIG. 20B

ELECTRONIC DEVICES HAVING MULTIPLE KEYPADS AND RELATED METHODS

FIELD OF THE INVENTION

The present invention relates to electronic devices, and in particular, to mobile devices having multiple keypads for different modes of operation and related methods.

BACKGROUND

Handheld communication devices typically include various functionalities integrated into a single unit. A single handheld device may provide Internet access, web-browsing, video and/or music playing, text display, gaming and other functions in addition to cellular communications.

Size constraints may be considerable on mobile devices that are configured as multipurpose, integrated handheld devices. Touch sensitive screens may provide increased flexibility for functionality such as web-browsing, telephone operation, text, gaming video/music playing etc. However, users may prefer traditional keypads having press-buttons for some operations, such as text operations or video game controls. In some handheld devices, a separate text keypad is positioned adjacent a touch display, for example, such as a QWERTY keypad for entering text for display on a screen. Such keypad/screen arrangements may be in slidable or clamshell configurations.

SUMMARY OF EMBODIMENTS OF THE INVENTION

In some embodiments, a device includes an upper unit having a display screen thereon and a first slidable unit having a first keypad thereon. The first slidable unit is slidably connected to the upper unit on a side opposite the display screen. The first slidable unit is movable between a closed position in which the upper unit generally overlies the first keypad and an open position in which the first keypad is positioned generally adjacent the display screen. A second slidable unit has a second keypad thereon. The second slidable unit is slidably connected to the upper unit and the first slidable unit. The second slidable unit is movable between a closed position in which the upper unit generally overlies the second keypad and an open position in which the second keypad is positioned generally adjacent the display screen.

In some embodiments, the second slidable unit generally overlies the first keypad on the first slidable unit when the second slidable unit is in the open position, and the first keypad on the first slidable unit is accessible to the user when the second slidable unit is in the closed position and the first slidable unit is in the open position.

In some embodiments, the second slidable unit may be received in the upper unit. The second slidable unit may be configured to engage with the first slidable unit when the first slidable unit is moved from the closed position to the open position so that the second slidable unit moves together with the first slidable unit from the closed position to the open position. In some embodiments, the second keypad of the second slidable unit is accessible to the user and the second slidable unit overlies the first keypad of the first slidable unit when the first and second slidable units are in the open position. In some embodiments, the second slidable unit is configured to disengage with the first slidable unit when the second slidable unit is moved from the open position to the closed position so that the second slidable unit is received in the upper unit and the first keypad of the first slidable unit is accessible to the user and the first slidable unit is in the open position.

In some embodiments, the second slidable unit is received in the first slidable unit. The second slidable unit may be configured to engage with the first slidable unit when the first slidable unit is moved from the closed position to the open position so that the second slidable unit moves together with the first slidable unit from the closed position to the open position. The second slidable unit may be configured to disengage with the first slidable unit when the first slidable unit is moved from the open position to the closed position so that the second slidable unit is in the open position and the second keypad is accessible to the user.

In some embodiments, the first keypad comprises control keys configured for controlling a video game. In some embodiments, the second keypad comprises keys configured for entering text into the device.

In some embodiments, a first biasing member is connected to the first slidable unit, and the first biasing member is configured to bias the first slidable unit in the open position. A first locking member is connected to the first slidable unit that engages the first slidable unit to retain the first slidable unit in the closed position and releases the first slidable unit such that the first biasing member moves the first slidable unit to the open position. In some embodiments, a second biasing member is connected to the second slidable unit, and the second biasing member is configured to bias the second slidable unit in the open position. A second locking member is connected to the second slidable unit that engages the second slidable unit to retain the second slidable unit in the closed position and to release the second slidable unit such that the second biasing member moves the second slidable unit to the open position.

In some embodiments, the device includes a connecting member configured to connect the first and second slidable units so that, when the first slidable unit is moved from the closed position to the open position, the second slidable unit is connected to the first slidable unit and moves together with the first slidable unit to the open position. The second slidable unit may overlie the first slidable unit when both the first and second slidable units are in the open position so that the second keypad is accessible to the user. The connecting member may be configured to release from at least one of the first and second slidable units when a user pushes the second slidable unit into the closed position so that the second slidable unit moves independently of the first slidable unit, and the first slidable unit remains in the open position so that the first keypad is accessible to the user.

In some embodiments, methods of operating a device are provided. The device includes an upper unit having a display screen thereon and a first slidable unit having a first keypad thereon. The first slidable unit is slidably connected to the upper unit on a side opposite the display screen. The first slidable unit is movable between a closed position in which the upper unit generally overlies the first keypad and an open position in which the first keypad is positioned generally adjacent the display screen. A second slidable unit has a second keypad thereon. The second slidable unit is slidably connected to the upper unit and the first slidable unit. The second slidable unit is movable between a closed position in which the upper unit generally overlies the second keypad and an open position in which the second keypad is positioned generally adjacent the display screen. The method includes moving the first and second slidable units to the open position such that the second slidable unit overlies the first slidable unit, and the second keypad is generally accessible to the user to operate the device in a mode of operation using the second keypad. The second slidable unit is moved to the closed position while the first slidable unit remains in the open position such that the first keypad is generally accessible to the user to operate the device in another mode of operation using the first keypad.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 18A is a top perspective view of the mobile terminal of FIG. 12 with the slidable keypad support in an open position with the QWERTY keypad accessible to the user FIG. 18B is an exploded perspective view of FIG. 18A illustrating a locking member on a bottom side of the mobile terminal of FIG. 12 in a closed position.

FIG. 18C is an exploded perspective view of FIG. 18A illustrating a locking member on a top side of the mobile terminal of FIG. 12 in a closed position.

FIG. 19A is a top perspective view of the mobile terminal of FIG. 12 with the slidable keypad support in an open position with the gaming keypad accessible to the user FIG. 19B is an exploded perspective view of FIG. 19A illustrating a bottom side of the mobile terminal of FIG. 12 in a closed position.

FIG. 20A is a bottom perspective view of the mobile terminal of FIG. 12 with the slidable keypad support in an open position with the gaming keypad accessible to the user.

FIG. 20B is an exploded bottom perspective view of the mobile terminal of FIG. 12 illustrating a locking member maintaining the slidable keypad support in an open position with the gaming keypad accessible to the user.

DETAILED DESCRIPTION OF EMBODIMENTS OF THE INVENTION

Figure 1:
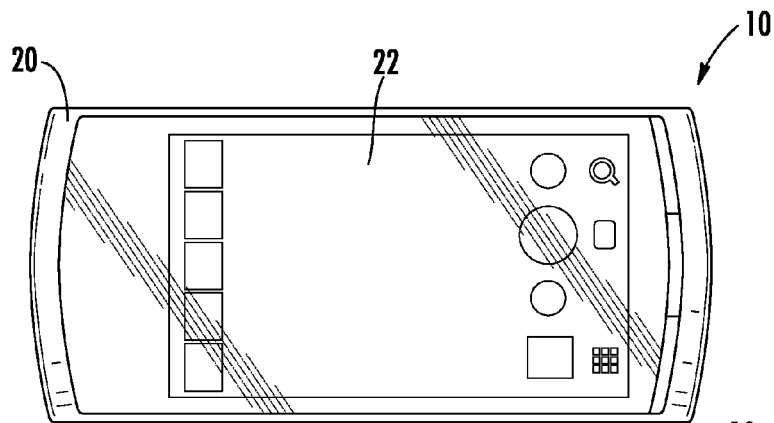
FIG. 1 is a top view of a mobile terminal in a closed position according to some embodiments of the present invention.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable non-transient storage medium having computer-usable or computer-readable program code embodied in the medium for use by or in connection with an instruction execution system.

The computer-usable or computer-readable medium may be, for example but not limited to, an electronic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Figure 2:
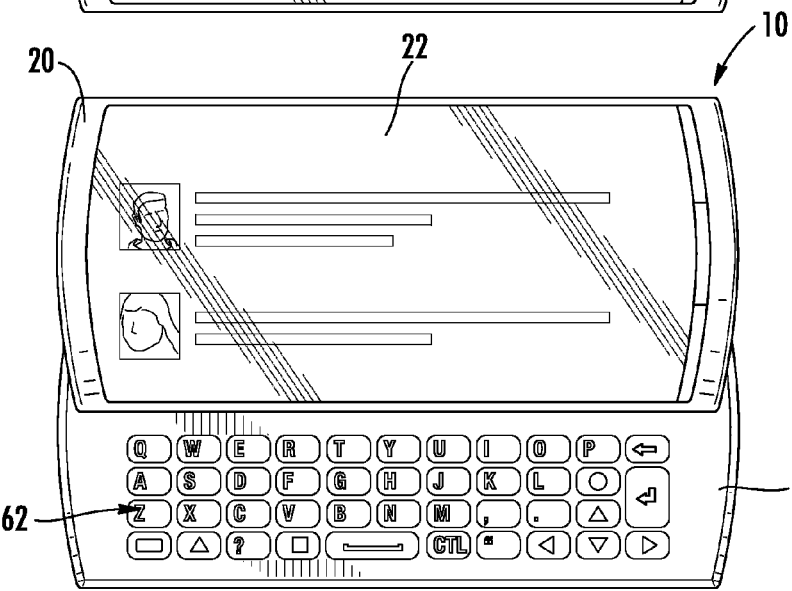
FIG. 2 is a top view of the mobile terminal of FIG. 1 with a QWERTY keyboard extended in an open position.
Figure 3:
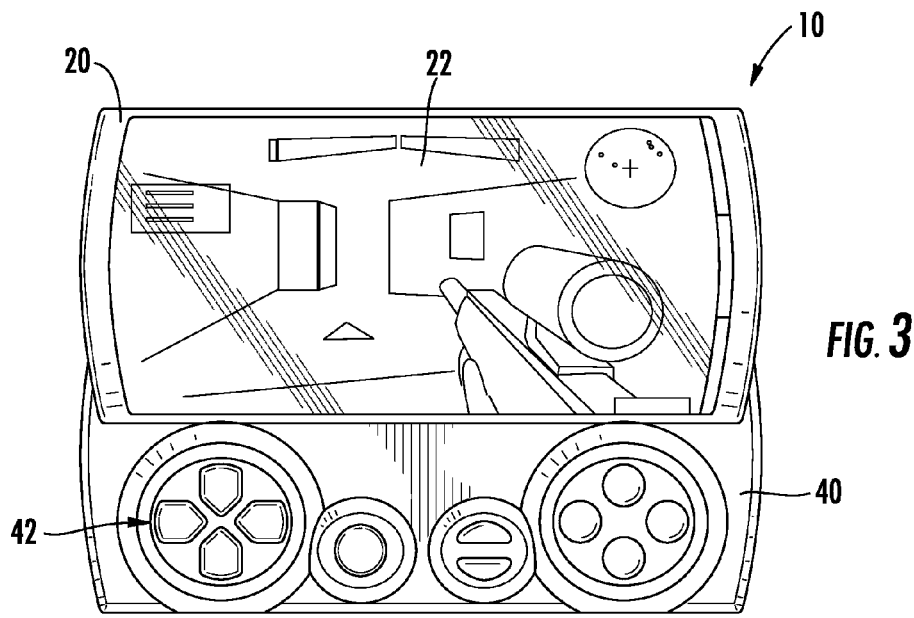
FIG. 3 is a top view of the mobile terminal of FIG. 1 with a gaming keyboard extended in an open position.
Figure 4:
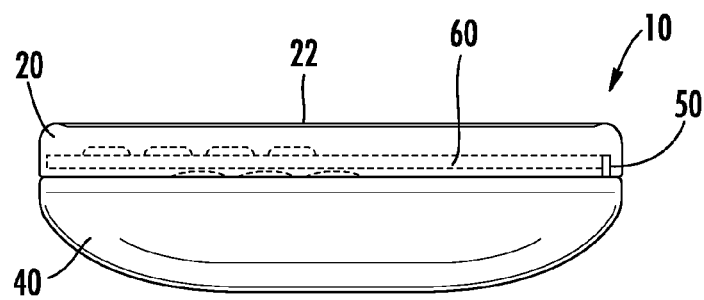
FIG. 4 is a side view of the mobile terminal of FIG. 1 in a closed position.
Figure 5:
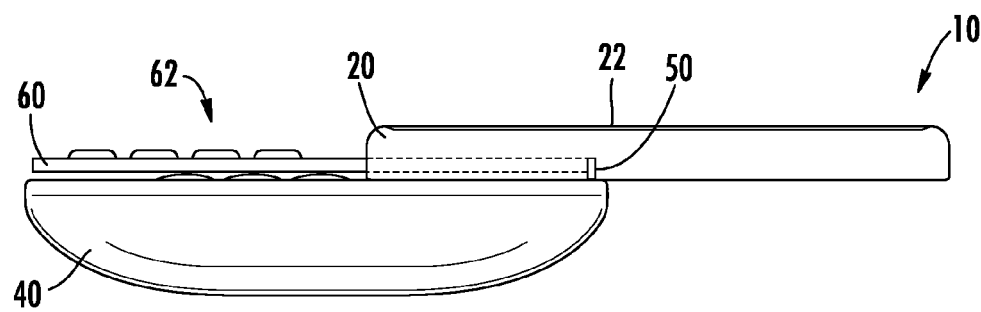
FIG. 5 is a side view of the mobile terminal of FIG. 1 with a QWERTY keyboard extended in an open position.

As illustrated in FIGS. 1-6, a mobile terminal 10 includes an upper unit 20 having a display screen 22 thereon and two slidable units 40 and 60. The slidable unit 40 has a first or gaming keypad 42, and the slidable unit 60 has a second or QWERTY keypad 62. The slidable unit 40 is slidably connected to the upper unit 20 on a side opposite the display screen 22. As illustrated in FIGS. 1-2 and FIGS. 4-5, the slidable unit 40 is movable between a first position in which the upper unit 20 generally overlies the first keypad 42 (FIGS. 1 and 4) and a second position in which the first keypad 42 is positioned generally adjacent the display screen 22 (FIGS. 2-3 and FIGS. 5-6). The slidable unit 60 is positioned generally between the upper unit 20 and the slidable unit 40 and is slidably connected to both the upper unit 20 and the slidable unit 40 so that the slidable unit 60 may move independently with respect to both the upper unit 20 and the slidable unit 40. The slidable unit 60 is movable between a first position in which the upper unit 20 generally overlies the second keypad 62 (FIGS. 1, 3, 5 and 6) and a second position in which the second keypad 62 is positioned generally adjacent the display screen 22 so that the display screen 22 and the second keypad 62 are accessible to the user (FIGS. 2 and 5).

Figure 6:
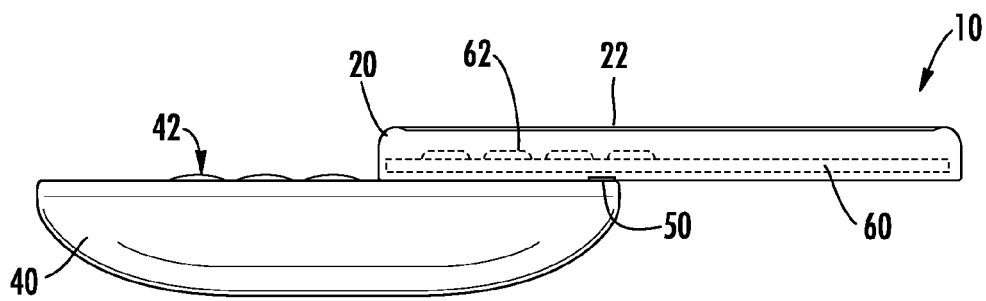
FIG. 6 is a side view of the mobile terminal of FIG. 1 with a gaming keyboard extended in an open position.

In some embodiments, the slidable units 40 and 60 are connected by a connecting member 50 that engages the units 40 and 60 together so that, when a user slides the slidable unit 40 into the open position, the slidable unit 60 moves together with the slidable unit 40 into the open position as shown in FIGS. 2 and 5. When both the slidable units 40 and 60 are in the open position, the keypad 62 is accessible to the user, and the slidable unit 60 overlies the keypad 42. When the user pushes the slidable unit 60 into the closed position, the connecting member 50 releases the slidable unit 40 so that the slidable unit 40 remains in the open position as shown in FIGS. 3 and 6. When the unit 60 is in the closed position and the unit 40 is in the open position, the keypad 42 is accessible to the user. When the user pushes the unit 40 into the closed position, the connecting member re-engages the slidable unit 50 so that movement of the unit 40 may move both units 40 and 60 as described above.

In this configuration, the user of the terminal 10 is able to use either the gaming keypad 42 or the QWERTY keypad 62 while viewing the display 22. In some embodiments, the display 22 is a touch sensitive display that may be used as another user interface. Accordingly, the terminal 10 may be operated in at least three different modes. As illustrated in FIGS. 1 and 4, the user may enter commands on the display 22 in a touch sensitive display mode, e.g., for internet viewing, reading text, viewing videos and the like. When the slidable units 40 and 60 are moved to the open position as illustrated in FIGS. 2 and 5, the user may operate the QWERTY keypad 62 and use the phone in a typing mode. When the slidable unit 60 is moved to the closed position as illustrated in FIGS. 3 and 6, the user may operate the exposed gaming keypad 42 to use the phone in a gaming mode. In some embodiments, the device 10 is configured to automatically switch a mode of operation responsive to the keypad that is accessible to the user. For example, the mobile device 10 automatically switches to a touch screen mode when the slidable units 40 and 60 are in the position illustrated in FIGS. 1 and 4, a text mode in the position illustrated in FIGS. 2 and 5, and a gaming mode in the position illustrated in FIGS. 3 and 6.

Figure 7:
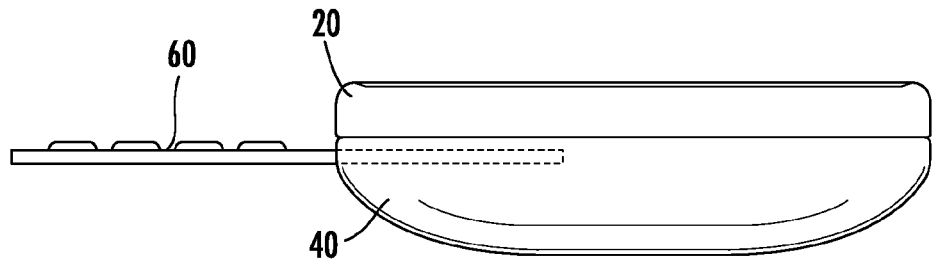
FIG. 7 is a side view of a mobile terminal according to some embodiments of the present invention.
Figure 8:
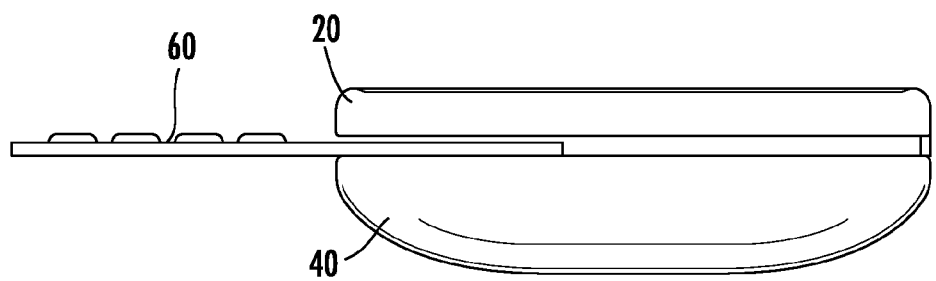
FIG. 8 is a side view of a mobile terminal according to some embodiments of the present invention.

Although embodiments according to the present invention are illustrated with respect to the upper unit 20 and the slidable units 40 and 60, it should be understood that other configurations may be used to provide at least two slidable units for different keypad configurations. For example, the slidable unit 60 is illustrated as being slidably received in the upper unit 20. However, the slidable unit 60 may be slidably received in the lower slidable unit 40 as illustrated in FIG. 7 or positioned between the upper unit 20 and the lower slidable unit 40 as illustrated in FIG. 8. Moreover, as illustrated in FIGS. 2 and 5, in the open position, the second keypad 62 generally overlies the first keypad 42. However, in some embodiments, the slidable unit 40 may be positioned such that the upper unit 20 overlies the slidable unit 40 when the unit 60 is in the extended second position shown in FIGS. 7 and 8. Moreover, it should be understood that, although embodiments according to the invention are illustrated with respect to a gaming keypad 42 and a QWERTY keypad 62, any suitable configuration of keys may be used, including a numeric keypad, a touchpad, a touch sensitive display or other user input keys known to those of skill in the art.

Figure 9:
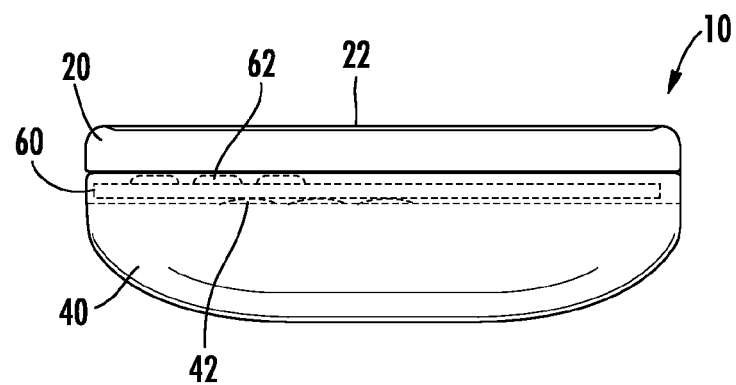
FIG. 9 is a side view of a mobile terminal according to some embodiments of the present invention in a closed position.
Figure 10:
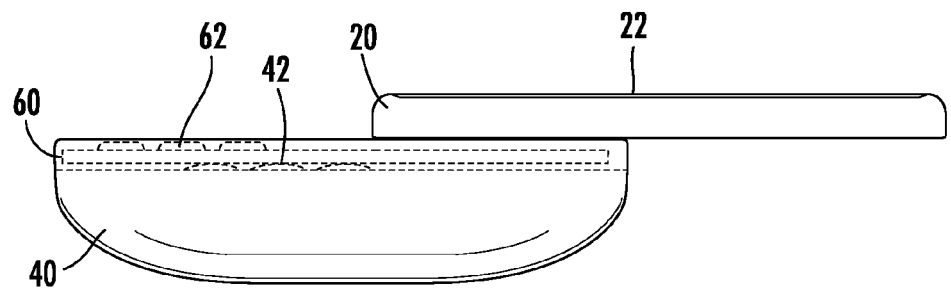
FIG. 10 is a side view of the mobile terminal of FIG. 9 in an open position with a QWERTY keypad exposed.
Figure 11:
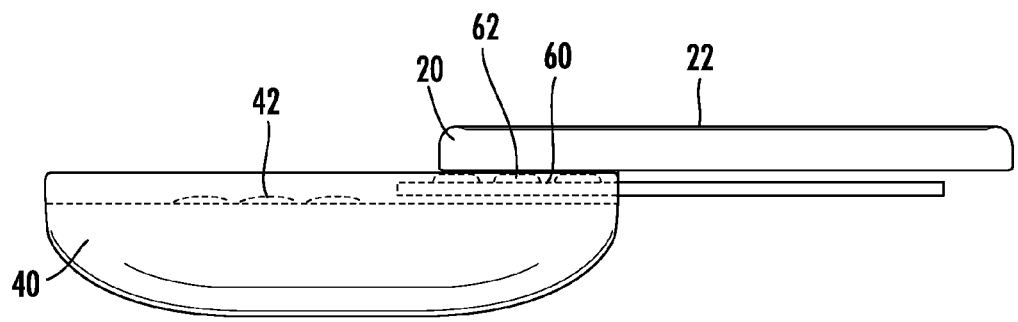
FIG. 11 is a side view of the mobile terminal of FIG. 9 in an open position with a gaming keypad exposed.
Figure 12:
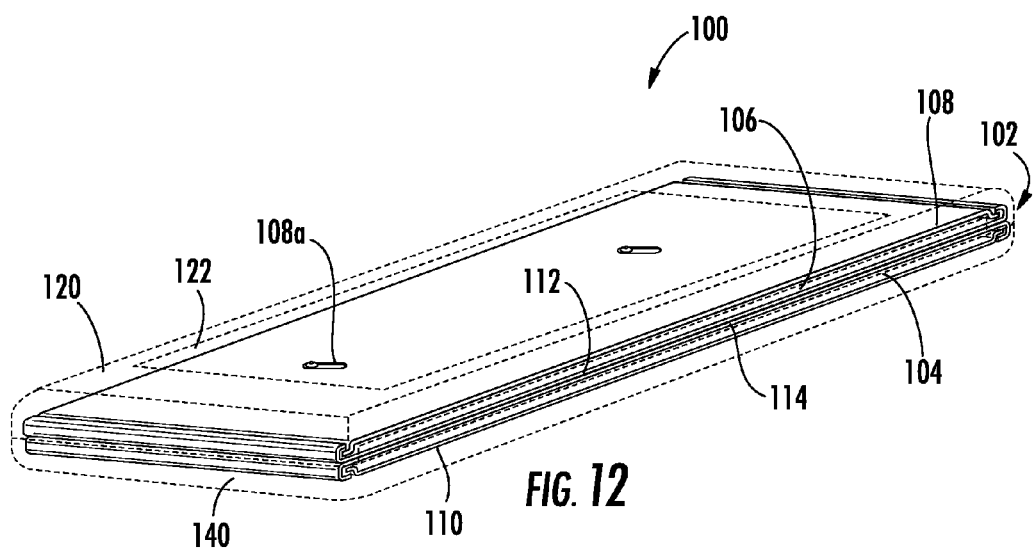
FIG. 12 is a perspective view of a slidable keypad support in a mobile terminal according to some embodiments of the present invention.
Figure 13:
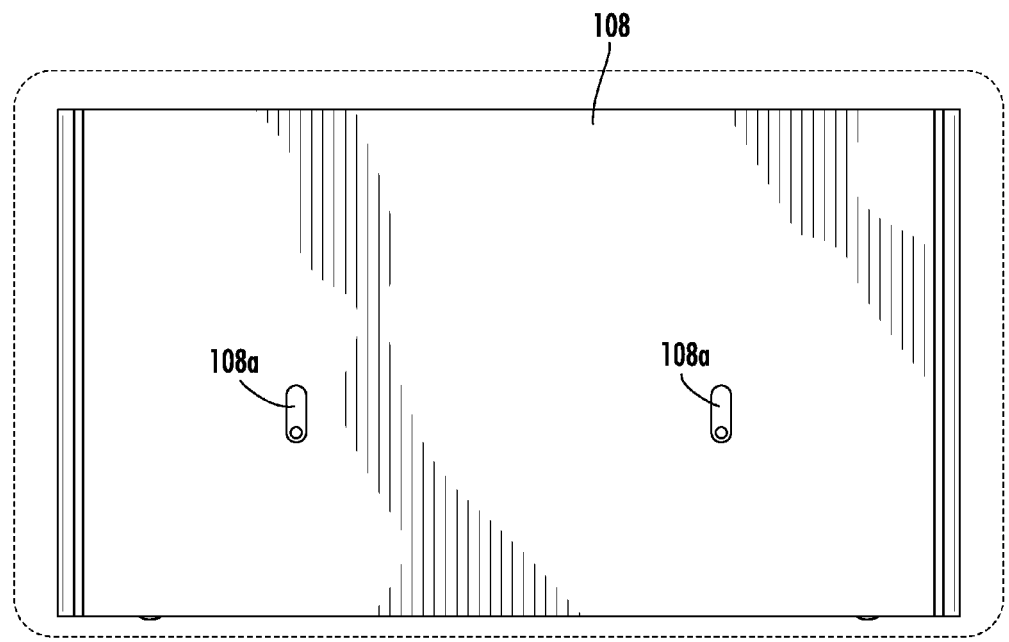
FIG. 13 is a top view of the mobile terminal of FIG. 12.
Figure 14:
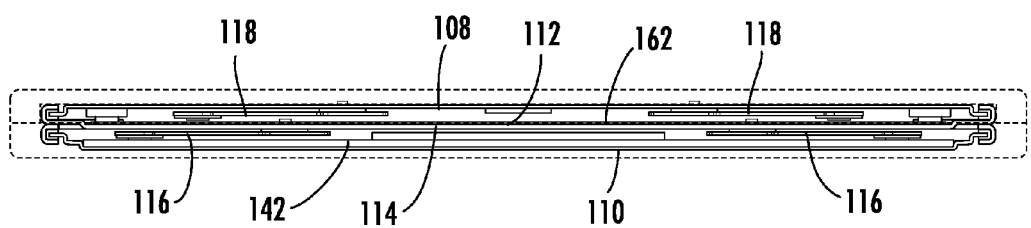
FIG. 14 is a side cross sectional view of the mobile terminal of FIG. 12.
Figures 15A, 15B:
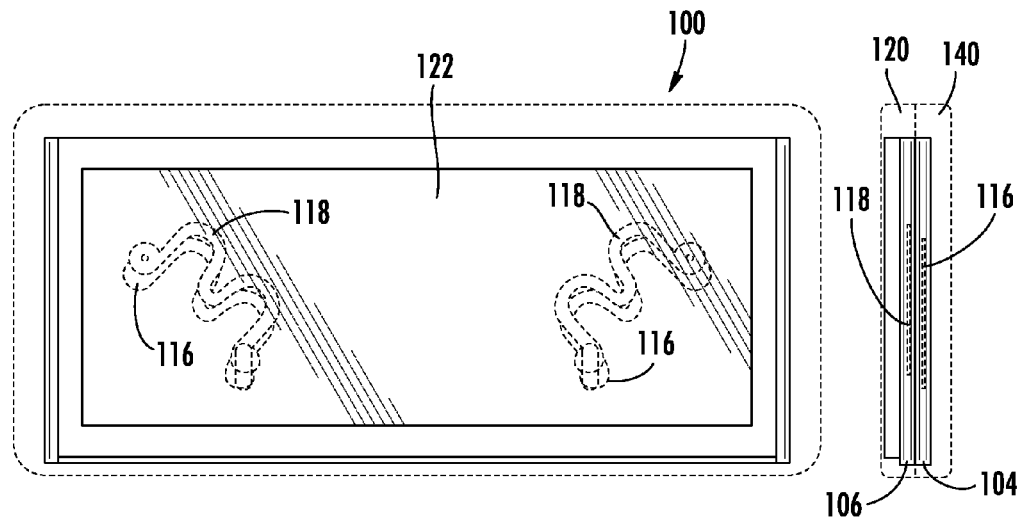
FIG. 15A is a top view of the mobile terminal of FIG. 12 with the slidable keypad support in a closed position.
FIG. 15B is a side view of the mobile terminal of FIG. 12 with the slidable keypad support in a closed position.

As illustrated in FIGS. 9-11, the slidable unit 60 is slidably received in the lower unit 40. In the closed configuration shown in FIG. 9, the keypads 42 and 62 are covered by the upper unit 20 so that the user has access to the display 22. When the slidable unit 40 and slidable unit 60 are extended as shown in FIG. 10, the user has access to the QWERTY keypad on the slidable unit 60 through an opening on the top surface of the lower slidable unit 40 as shown in FIG. 2. The slidable unit 60 may be pushed out of the lower slidable unit 40, e.g., by the user through an opening in the back of the lower unit 40 so that the user has access to the gaming keypad 42 on the unit 40 as shown in FIG. 11.

Any suitable slidable configuration may be used, including slidable configurations known to those of skill in the art. For example, a "push-push" configuration may be used in which the slidable units are biased in an open/extended position and lock (e.g., using a retaining or locking member) into a closed position when the user pushes the slidable unit into a slot in the device. Another push on the slidable unit when it is in the closed position (inside the slot) causes the slidable unit to release from the slot and move to the extended position. Moreover, the slidable units and the upper unit of the device may be electrically connected to one another and/or to a common processor to allow user inputs on the touch screen or on the keypads to be received as inputs to the device. In some embodiments, electrical connections, such as flexible printed circuit boards, fiber optics or other electrical connectors that enable communications between the moveable units and the upper unit may be used.

Another exemplary device 100 is illustrated in FIGS. 12-23. The device 100 includes a top housing unit 120 having a display 122 (such as a touch sensitive display) thereon, and a bottom housing unit 140. The device 100 further includes a keypad support 102 that is mounted on the bottom housing unit 140 and defines a lower slot 104 and an upper slot 106. The upper slot 106 includes a top plate 108 connected at opposite ends thereof to a bottom plate 112, and the lower slot 104 includes a top plate 114 connected at opposite ends thereof to a lower plate 110. The top plate 108 includes slots 108a for retaining springs 118, and the top plate 114 includes slots (not shown) that are analogous to the slots 108a of the top plate 108 for retaining springs 116. A QWERTY keypad 162 is positioned on the lower plate 112 of the upper slot 106 and a gaming keypad 142 is positioned on the lower plate 110 of the lower slot 104. The bottom housing unit 140 is in slidable relationship with the top housing unit 120 and the QWERTY keypad 162.

As shown in FIGS. 12-14 and FIGS. 15A-15B, the keypads 142 and 162 are in a closed position in which the display 122 is positioned to generally overlie the keypads 142 and 162. In this configuration, the user may operate the device 100 using the display 122, which may be a touch sensitive display.

Figures 16A, 16B:
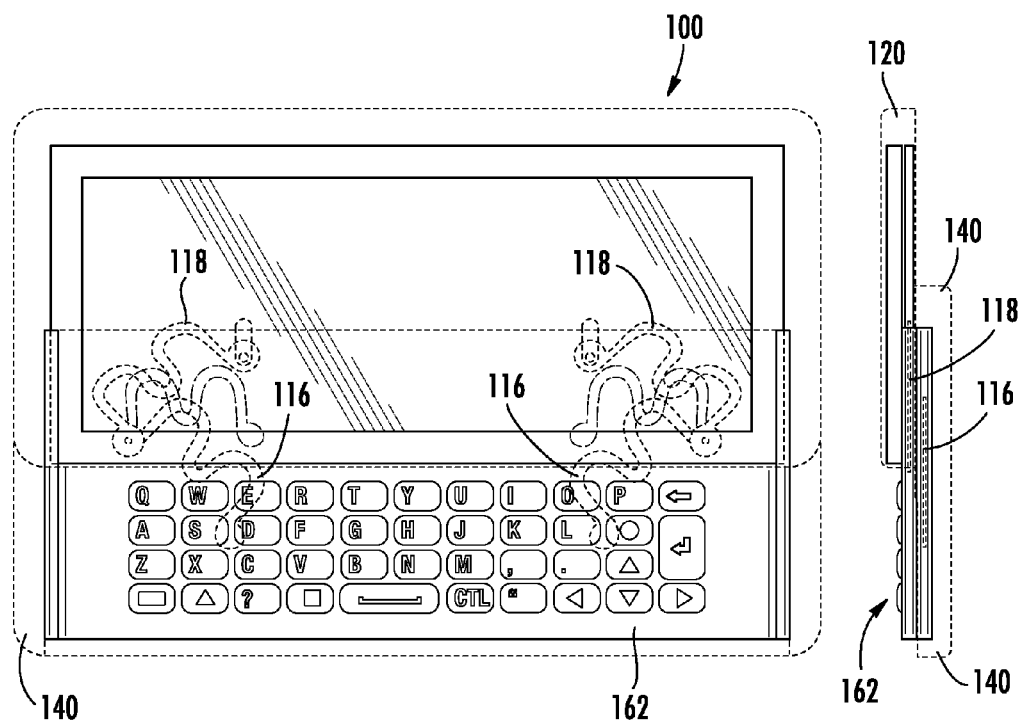
FIG. 16A is a top view of the mobile terminal of FIG. 12 with the slidable keypad support in an open position with the QWERTY keypad accessible to the user.
FIG. 16B is a side view of the mobile terminal of FIG. 12 with the slidable keypad support in an open position with the QWERTY keypad accessible to the user.
Figures 17A, 17B:
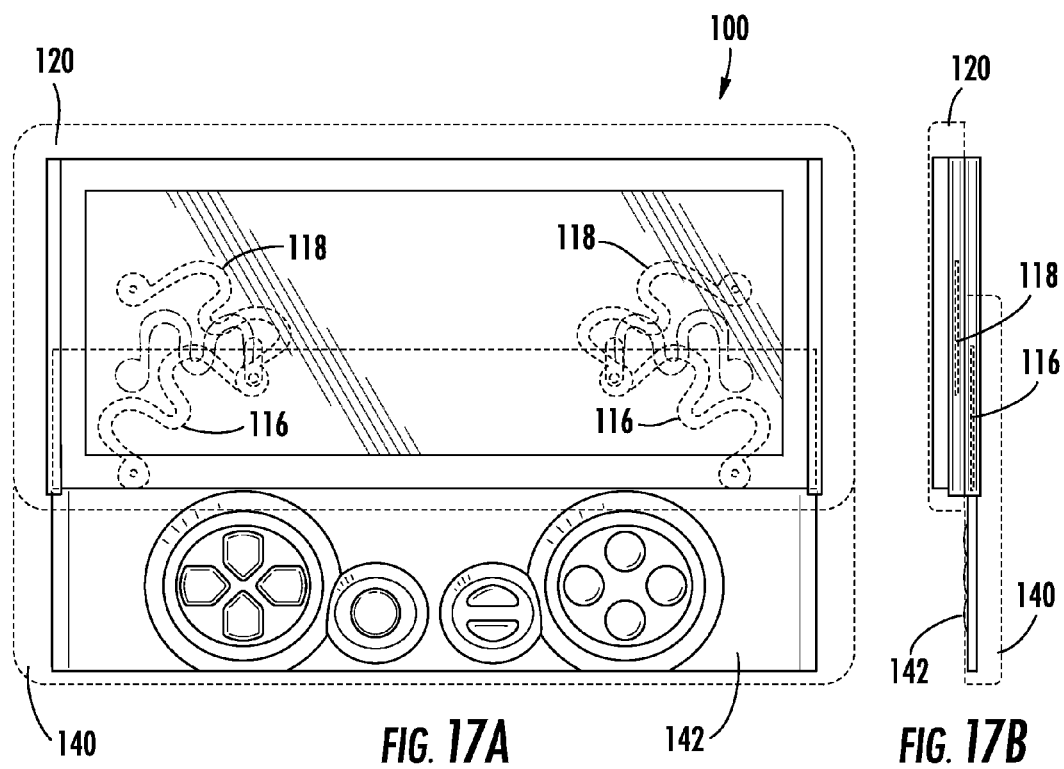
FIG. 17A is a top view of the mobile terminal of FIG. 12 with the slidable keypad support in an open position with the gaming keypad accessible to the user.
FIG. 17B is a side view of the mobile terminal of FIG. 12 with the slidable keypad support in an open position with the gaming keypad accessible to the user.

As illustrated in FIGS. 16A, 16B and 18A, the upper housing 120 includes a notch 126 and a retaining slot 128, and the upper slot 106 includes a button 107 and retaining member 127. As shown in FIG. 18A, the upper keypad 162 is retained by the notch 126 by the retaining member 127 when the keypad 162 is in the closed position. As shown in FIGS. 16A, 16B and 18A, when the user moves the lower housing unit 140, the keypad 162 is dislodged from the notch 126, and the biasing members or springs 116, 118 bias the lower housing 140 and the keypad 162 into the open position such that the keypad 162 is positioned adjacent the display 122 and is accessible to the user. In this position, the keypad 162 may be used to enter text and the device 100 may be operated in a text mode. As shown in FIGS. 18A and 18C, when the lower housing unit 140 is in the extended position, the notch 107 extends into the retaining slot 128 to retain the lower housing unit 140 in the extended or open position.

The notch 107 may be depressed by the user, for example, by moving the keypad 162 to a closed position in the top slot 106 as shown in FIGS. 17A, 17B, 19A-19B and 20A-20B. The housing unit 140 and keypad 142 remain in the open/extended position so that the gaming keypad 142, which is mounted to the housing unit 140, is revealed and is accessible to the user. In this position, the device 100 may be operated in a gaming mode. The keypad 162 may be retained in the housing unit 120 by the notch 126. The gaming keypad 142 may be held in an open position by retaining slots 148 in the housing 120, which are configured to receive a button (not shown) on the housing therein (analogous to button 107). The notch 146 is configured to engage the retaining member 147 and retain the housing 140 and the gaming keypad 142 in the closed position as shown in FIG. 19B.

Although the keypads 142, 162 are illustrated as a gaming keypad 142 and a QWERTY keypad 162, other types of keypads may be used, such as a numeric keypad, a touchpad, a touch sensitive display or other user input keys known to those of skill in the art.

Although embodiments according to the present invention are described with respect to mobile terminals, it should be understood that stationary electronic devices may also be used.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A device comprising:
an upper unit having a display screen thereon;
a first slidable unit having a first keypad thereon, the first slidable unit being slidably connected to the upper unit on a side opposite the display screen, the first slidable unit being movable between a closed position in which the upper unit generally overlies the first keypad and an open position in which the first keypad is positioned generally adjacent the display screen; and
a second slidable unit having a second keypad thereon, the second slidable unit being slidably connected to the upper unit and the first slidable unit; the second slidable unit being movable between a closed position in which the upper unit generally overlies the second keypad and an open position in which the second keypad is positioned generally adjacent the display screen;
wherein the second slidable unit generally overlies the first keypad on the first slidable unit when the second slidable unit is in the open position, and the first keypad on the first slidable unit is accessible to the user when the second slidable unit is in the closed position and the first slidable unit is in the open position, and wherein the second slidable unit is received in the upper unit in the closed position;
wherein the second slidable unit is configured to engage with the first slidable unit when the first slidable unit is moved from the closed position to the open position so that the second slidable unit moves together with the first slidable unit from the closed position to the open position;
wherein the second keypad of the second slidable unit is accessible to the user and the second slidable unit overlies the first keypad of the first slidable unit when the first and second slidable units are in the open position;
wherein when the second slidable unit is in the open position, the second slidable unit is configured to disengage with the first slidable unit when the first slidable unit is moved from the open position to the closed position so that the second slidable unit remains in the open position and the second keypad is accessible to the user.

2. The device of claim 1, wherein the second slidable unit is configured to disengage with the first slidable unit when the second slidable unit is moved from the open position to the closed position so that the second slidable unit is received in the upper unit and the first keypad of the first slidable unit is accessible to the user and the first slidable unit is in the open position.

3. A device comprising:
an upper unit having a display screen thereon;
a first slidable unit having a first keypad thereon, the first slidable unit being slidably connected to the upper unit on a side opposite the display screen, the first slidable unit being movable between a closed position in which the upper unit generally overlies the first keypad and an open position in which the first keypad is positioned generally adjacent the display screen; and
a second slidable unit having a second keypad thereon, the second slidable unit being slidably connected to the upper unit and the first slidable unit; the second slidable unit being movable between a closed position in which the upper unit generally overlies the second keypad and an open position in which the second keypad is positioned generally adjacent the display screen;
wherein the second slidable unit generally overlies the first keypad on the first slidable unit when the second slidable unit is in the open position, and the first keypad on the first slidable unit is accessible to the user when the second slidable unit is in the closed position and the first slidable unit is in the open position, and wherein the second slidable unit is received in the first slidable unit;
wherein the second slidable unit is configured to engage with the first slidable unit when the first slidable unit is moved from the closed position to the open position so that the second slidable unit moves together with the first slidable unit from the closed position to the open position
wherein when the second slidable unit is in the open position, the second slidable unit is configured to disengage with the first slidable unit when the first slidable unit is moved from the open position to the closed position so that the second slidable unit remains in the open position and the second keypad is accessible to the user.

4. The device of claim 1, wherein the first keypad comprises control keys configured for controlling a video game.

5. The device of claim 4, wherein the second keypad comprises keys configured for entering text into the device.

6. The device of claim 1, further comprising:
a first biasing member connected to the first slidable unit, the first biasing member configured to bias the first slidable unit in the open position; and
a first locking member connected to the first slidable unit that engages the first slidable unit to retain the first slidable unit in the closed position and releases the first slidable unit such that the first biasing member moves the first slidable unit to the open position.

7. The device of claim 6, further comprising:
a second biasing member connected to the second slidable unit, the second biasing member configured to bias the second slidable unit in the open position; and
a second locking member connected to the second slidable unit that engages the second slidable unit to retain the second slidable unit in the closed position and releases the second slidable unit such that the second biasing member moves the second slidable unit to the open position.

8. The device of claim 1, further comprising:
a connecting member configured to connect the first and second slidable units so that, when the first slidable unit is moved from the closed position to the open position, the second slidable unit is connected to the first slidable unit and moves together with the first slidable unit to the open position.

9. The device of claim 8, wherein the second slidable unit overlies the first slidable unit when both the first and second slidable units are in the open position so that the second keypad is accessible to the user.

10. The device of claim 9, wherein the connecting member is configured to release from at least one of the first and second slidable units when a user pushes the second slidable unit into the closed position so that the second slidable unit moves independently of the first slidable unit, and the first slidable unit remains in the open position so that the first keypad is accessible to the user.

11. A method of operating a device, the device comprising: an upper unit having a display screen thereon; a first slidable unit having a first keypad thereon, the first slidable unit being slidably connected to the upper unit on a side opposite the display screen, the first slidable unit being movable between a closed position in which the upper unit generally overlies the first keypad and an open position in which the first keypad is positioned generally adjacent the display screen; and a second slidable unit having a second keypad thereon, the second slidable unit being slidably connected to the upper unit and the first slidable unit; the second slidable unit being movable between a closed position in which the upper unit generally overlies the second keypad and an open position in which the second keypad is positioned generally adjacent the display screen, wherein the second slidable unit generally overlies the first keypad on the first slidable unit when the second slidable unit is in the open position, and the first keypad on the first slidable unit is accessible to the user when the second slidable unit is in the closed position and the first slidable unit is in the open position, the method comprising:

moving the first and second slidable units to the open position such that the second slidable unit overlies the first slidable unit, and the second keypad is generally accessible to the user to operate the device in a mode of operation using the second keypad;

moving the second slidable unit to the closed position while the first slidable unit remains in the open position such that the first keypad is generally accessible to the user to operate the device in another mode of operation using the first keypad, wherein the second slidable unit is received in the upper unit in the closed position;

engaging the second slidable unit with the first slidable unit when the first slidable unit is moved from the closed position to the open position so that the second slidable unit moves in together with the first slidable unit from the closed position to the open position; and when the second slidable unit is in the open position, disengaging the second slidable unit from the first slidable unit when the first slidable unit is moved from the open position to the closed position so that the second slidable unit remains in the open position and the second keypad is accessible to the user.

* * * * *